(12) United States Patent
Mori et al.

(10) Patent No.: US 9,133,883 B2
(45) Date of Patent: Sep. 15, 2015

(54) COUPLING DEVICE FOR CONNECTING ROTARY MEMBERS

(75) Inventors: Hirotsugu Mori, Kariya (JP); Junichi Maeda, Takahama (JP); Yasuhiro Sasaki, Okazaki (JP)

(73) Assignees: ADVICS CO., LTD., Kariya-Shi, Aichi-Ken (JP); DENSO CORPORATION, Kariya-Shi, Aichi-Ken (JP)

( * ) Notice: Subject to any disclaimer, the term of this patent is extended or adjusted under 35 U.S.C. 154(b) by 140 days.

(21) Appl. No.: 13/568,676

(22) Filed: Aug. 7, 2012

(65) Prior Publication Data

US 2013/0039696 A1 Feb. 14, 2013

(30) Foreign Application Priority Data

Aug. 8, 2011 (JP) .................................. 2011-172657

(51) Int. Cl.
*F16D 1/116* (2006.01)
*F16D 3/84* (2006.01)
*F16D 1/10* (2006.01)

(52) U.S. Cl.
CPC ........... *F16D 1/101* (2013.01); *F16D 1/10* (2013.01); *F16D 1/116* (2013.01); *F16D 3/841* (2013.01);
(Continued)

(58) Field of Classification Search
CPC ............. F16B 7/22; F16D 1/02; F16D 1/108; F16D 1/112; F16D 1/116; F16D 3/843; F16J 15/02; F16J 15/061; F16J 15/32; F16J 15/3224
USPC ............ 464/7, 160, 170, 173, 901; 403/1, 40, 403/286, 288, 354, 364, 376, 377, 383; 277/628, 630, 634, 637, 638, 640
See application file for complete search history.

(56) References Cited

U.S. PATENT DOCUMENTS 2,060,209 A * 11/1936 Heckert ......................... 403/286
4,592,556 A *  6/1986 Nieman et al. ................. 277/558

(Continued)

FOREIGN PATENT DOCUMENTS

CN  1093150 A  10/1994
CN  2854190 Y   1/2007

(Continued)

OTHER PUBLICATIONS

Japanese Notification of Reasons for Refusal dated Aug. 19, 2014 issued in the corresponding Japanese Patent Application No. 2011-172657 and English language translation (4 pages).

(Continued)

*Primary Examiner* — Daniel P Stodola
*Assistant Examiner* — Josh Skroupa
(74) *Attorney, Agent, or Firm* — Buchanan Ingersoll & Rooney PC

(57) ABSTRACT

A coupling device including a first rotary member and a second rotary member are opposed and connected to each other on the same axial line, wherein a cap to cover a connection part is a cylindrical shape having a bottom wall and a protrusion insertion hole formed on the bottom wall and covers the first rotary member from a connection end-side of the first rotary member, wherein the cap is axially urged by an elastic member to bring at least one of an opening-side end face and the bottom wall of the cap into contact with an annular end face formed on the first rotary member, and wherein an accommodation chamber of the connection part is formed in the cap to reserve lubricant, and an exit of the accommodation chamber of the connection part is blocked or narrowed by a force of the elastic member.

5 Claims, 10 Drawing Sheets

(52) U.S. Cl.
CPC ....... *F16D 2001/102* (2013.01); *F16D 2300/06* (2013.01); *Y10T 403/50* (2015.01); *Y10T 403/608* (2015.01); *Y10T 403/7045* (2015.01); *Y10T 403/7098* (2015.01)

(56) References Cited

U.S. PATENT DOCUMENTS

| | | | | |
|---|---|---|---|---|
| 4,781,400 | A * | 11/1988 | Cunningham | 285/39 |
| 5,069,489 | A * | 12/1991 | Bartholomew | 285/319 |
| 5,078,533 | A * | 1/1992 | Madonio et al. | 403/288 |
| 5,085,129 | A * | 2/1992 | Dugan | 92/84 |
| 5,090,748 | A * | 2/1992 | Usui et al. | 285/319 |
| 5,540,463 | A * | 7/1996 | Potokar | 285/319 |
| 5,562,360 | A * | 10/1996 | Huang | 464/182 |
| 6,267,416 | B1 * | 7/2001 | Ferreira et al. | 285/319 |
| 6,343,814 | B1 * | 2/2002 | Bucher et al. | 285/319 |
| 6,447,024 | B1 * | 9/2002 | Olson | 285/319 |
| 6,767,034 | B2 * | 7/2004 | Le Clinche | 285/319 |
| 7,097,568 | B2 * | 8/2006 | Kuczera et al. | 464/173 |
| 8,070,613 | B2 * | 12/2011 | Cermak | 464/182 |
| 8,322,941 | B2 * | 12/2012 | Cermak | 403/317 |
| 2011/0250976 | A1 | 10/2011 | Yamaguchi et al. | |

FOREIGN PATENT DOCUMENTS

| | | | | |
|---|---|---|---|---|
| CN | 201902470 U | | 7/2011 | |
| DE | 102009020981 | * | 11/2010 | ............ F16D 1/116 |
| JP | S48-064640 A | | 8/1973 | |
| JP | 06201020 | * | 7/1994 | ............ F16H 55/17 |
| JP | 2004-68836 A | | 3/2004 | |
| JP | 2005-207549 A | | 8/2005 | |
| JP | 2006-144965 A | | 6/2006 | |
| JP | 2008-167585 A | | 7/2008 | |
| JP | 2011-80530 A | | 4/2011 | |

OTHER PUBLICATIONS

Chinese First Office Action and Search Report dated Dec. 31, 2014 issued in the corresponding Chinese Patent Application No. 201210280859.3 and English translation (16 pages).

* cited by examiner

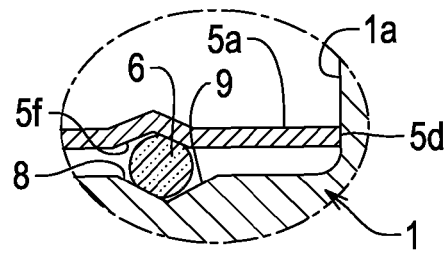
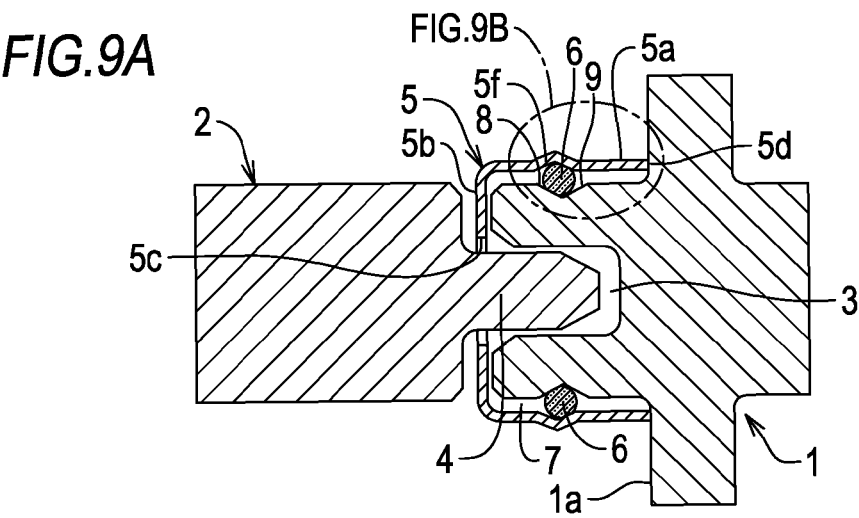
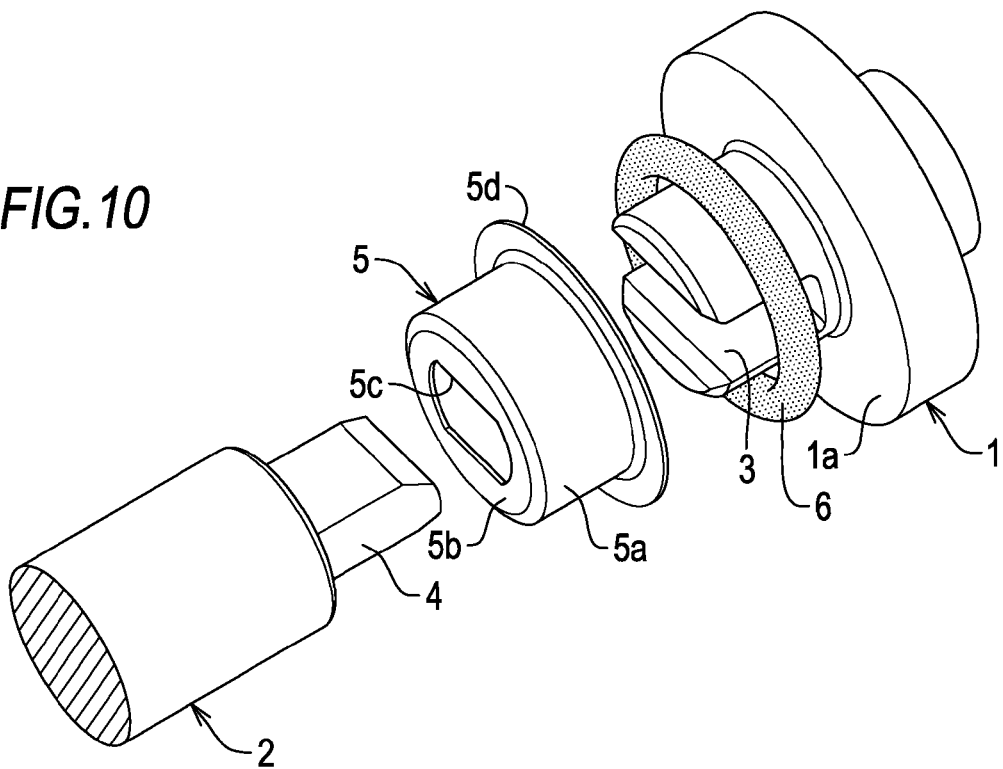

COUPLING DEVICE FOR CONNECTING ROTARY MEMBERS

CROSS-REFERENCE TO RELATED APPLICATION

This application claims priority from Japanese Patent Application No. 2011-172657 filed on Aug. 8, 2011, the entire subject matter of which is incorporated herein by reference.

TECHNICAL FIELD

This disclosure relates to a coupling device of fitting and connecting two rotary members so that torque is to be transferred, and more specifically, to a coupling device that is effective when lubricating a fitting face of a connection part, on which sliding inevitably occurs as the rotary members are rotated, by lubricant agent.

BACKGROUND

There are many cases, in which two rotary members are connected by a coupling device having a function of absorbing axis deviation. For example, the coupling device is used in a brake fluid pressure control apparatus for a vehicle having control functions such as ABS (Antilock Brake System for antilock control), ESC (Electronic Stability Control for sideslip suppression control), TCS (Traction Control System) and the like, and the apparatus includes a pump that is driven by a motor.

The pump includes a plunger pump and a gear pump. In the gear pump, an output shaft of a motor is connected to a rotor shaft having a pump rotor mounted thereto, and the motor drives to rotate the rotor shaft.

The connection between the rotor shaft and the output shaft of the motor is made by using a coupling device capable of absorbing axis deviation because the axis deviation inevitably occurs between both the shafts. The coupling device is disclosed in JP-A-2004-68836 and JP-A-2011-80530, for example.

SUMMARY

In the coupling device disclosed in JP-A-2004-68836 and JP-A-2011-80530, the axis deviation (deviation of shaft centers) inevitably occurs for the shaft that is connected by fitting a convex part of the one shaft into a recess of the other shaft. Therefore, when a driven shaft is rotated by a driving shaft, a small relative displacement is caused due to vibration between both the shafts. Due to this, an axis deviation absorbing part (i.e., sliding part) of the coupling device is worn.

In a case of a coupling device of a rotary shaft having a high driving frequency or a coupling device that is originally small and is difficult to maintain a strength due to size reduction resulting from the wear, a lifespan thereof is reduced due to the wear.

Accordingly, it is desired to suppress the wear of the sliding part by lubricating by lubricant. However, in a case of a coupling device that is used in an environment where it is not possible to supply oil from the outside due to the complicated structure, the small size thereof and the like, it depends on a limited amount of the lubricant that has been supplied to the sliding part in advance. Hence, when it is not possible to maintain the lubricant at the sliding part, the wear is accelerated at an early stage.

As a measure to counter the wear, JP-A-2011-80530 discloses that sliding faces are configured by a concave curved face and a convex curved face to lower face pressures of both faces, the sliding faces are formed with DLC (diamond like carbon) coatings to protect the sliding faces. Likewise, it is possible to reduce the coefficient of friction by applying the lubricant to the sliding part. However, in a case of a rotary member used in an environment, in which the rotary member is easily influenced by heat, and that rotates at high speed, the viscosity of the lubricant is lowered due to the influence of the heat and then lubricant is apt to scatter by a centrifugal force, so that it is difficult to maintain the lubricating effect for a long time by the above measures.

Therefore, it is considered to cover a fitting connection part of the rotary member with a cap. By press-fitting and attaching the cap to one rotary shaft, it is possible to fix the cap and to block a gap between the cap and the shaft, which is an outflow path of the lubricant, at the same time. However, when the rotary shaft to which the cap is press-fitted is the output shaft of the motor, the load resulting from the press fitting is applied to the corresponding shaft, so that an internal part of the motor is shifted in an axial direction.

This disclosure provides at least a coupling device interconnecting rotary members capable of absorbing axis deviation of first and second rotary members, in which lubricant preliminary filled in the rotary members is stably sealed to a sliding part by a simple cap to keep a lubricating effect for a long time and to improve long-term durability of the sliding part.

Also, when the rotary member is an output shaft of a motor, a cap may be mounted to the output shaft only after the motor is assembled. If excessive load is applied upon the mount of the cap to the output shaft of the motor, a part in the motor may be deviated in an axial direction. Accordingly, this disclosure also provides configuration to stably mount a cap without applying excessive load to an output shaft of the motor, even if the rotary member is the output shaft.

In view of the above, a coupling device according to the this disclosure includes a first rotary member and a second rotary member opposed and connected to each other on the same axial line, and a fitting recess provided to the first rotary member and a fitting protrusion provided to the second rotary member corresponding to the fitting recess are fitted each other to connect both of the rotary members so that torque is to be transferred, is configured as follows.

Specifically, a cap to cover a connection part is a cylindrical shape having a bottom wall and a protrusion insertion hole, through which the fitting protrusion of the second rotary member passes, formed on the bottom wall and covers the first rotary member from a connection end-side of the first rotary member. The cap is axially urged by an elastic member to bring at least one of an opening-side end face and the bottom wall of the cap into contact with an annular end face formed on the first rotary member, and the accommodation chamber of the connection part is formed in the cap to reserve lubricant, and an exit of the accommodation chamber of the connection part is blocked or narrowed by a force of the elastic member. Hereinafter, the above-described configuration is also refereed as a first illustrative embodiment.

Further, in another configuration, similarly to the first illustrative embodiment, a coupling device includes a similar cap covering the first rotary member and an elastic member that is provided independently from the cap is axially compressed and positioned between an opening-side end face of the cap and an annular end face formed on the first rotary member so that the cap is pressed to a connection-side end face of the second rotary member by a force of the elastic member to fix the cap to the rotary members, and an accommodation chamber of the connection part is formed in the cap to reserve lubricant, and an exit of the accommodation chamber of the connection part is blocked or narrowed by a force of the elastic member. Hereinafter, the above-described configuration is also refereed as a second illustrative embodiment.

Here, one of the first rotary member and the second rotary member is corresponding to a driving-side rotary member, and the other of the first rotary member and the second rotary member is corresponding to a driven-side rotary member. In case that the first rotary member is a driving shaft of the motor, an inner race of the bearing, which is fixed to the outer peripheral of the driving shaft to rotate together with the driving shaft, is considered as a part of the first rotary member.

Additionally, the annular end face indicates an end face of a portion formed at outer peripheral or a connection-side end face connecting the second rotary member of the first rotary member.

The coupling device according to the first illustrative embodiment may be further includes at lease one of following five configurations, for example.

1) The elastic member is integrally formed with the cap, and an inclined face bearing a reaction force is formed on an outer periphery of at least one of the first rotary member and second rotary member, and the elastic member is elastically pressed to the inclined face, so that the cap is pressed to the annular end face and is fixed to the rotary members by an axial component force generated at the elastic pressing part.

2) A part of a peripheral wall of the cap is inwardly cut and bent to configure a lancing piece that configures the elastic member, and the lancing piece also serves as a check claw, and the inclined face is configured by a face that is diametrically displaced toward an inner side as an axial distance from the second rotary member is increased, and the inclined face is provided on the outer periphery of the first rotary member so that the elastic member is elastically pressed to the inclined face to cause the axial component force.

3) The cap has a cylindrical extension part that surrounds an outer periphery of a connection-side of the second rotary member, and a part of the cylindrical extension part is cut and bent toward an inner side of the cap to configure a lancing piece, the elastic member is configured by the lancing piece, and the inclined face is configured by a face that is diametrically displaced toward an inner side as it is directed toward the first rotary member, and the inclined face is provided on the outer periphery of the second rotary member so that the elastic member is elastically pressed to the inclined face to cause the axial component force.

4) The elastic member is integrally formed with the cap, and the elastic member is elastically deformed and positioned between the first rotary member and the second rotary member, so that the cap is pressed to the annular end face and is fixed to the rotary members by a force of the elastic member.

5) The elastic member is integrally formed with the cap, and the elastic member is elastically deformed and positioned between the first rotary member and the second rotary member, so that the cap is pressed to the annular end face and is fixed to the rotary members by a force of the elastic member.

The coupling device according to both of the first illustrative embodiment and the second illustrative embodiment may be further includes at lease one of four configurations as follows, for example.

1) The fitting protrusion and the protrusion insertion hole of the cap, through which the fitting protrusion is inserted, are made as a protrusion having a non-circular section and a hole having a non-circular section corresponding thereto, respectively, and the fitting protrusion and the protrusion insertion hole are fitted each other to suppress relative rotation of the cap with respect to the rotary members.

2) The cap has at least one of a projection diametrically protruding from an inner face of a peripheral wall toward a inner side and a projection protruding from an inner face of the bottom wall in an axial direction, and the at least one of the projections is inserted into a part of the fitting recess and is engaged with an inner face of the fitting recess to suppress relative rotation of the cap with respect to the rotary members.

3) The fitting recess is a clevis recess opened toward the outer periphery of the first rotary member, and the fitting protrusion is configured by a clevis protrusion, and the clevis recess and the clevis protrusion are fitted to connect the first rotary member and the second rotary member with each other.

4) The fitting recess is a rectangle hole opened toward a connection-side end face of the first rotary member, and the fitting protrusion is configured by a shaft having a non-circular section that is inserted into the rectangle hole to not relatively rotate, and the rectangle hole and the shaft are fitted to connect the first rotary member and the second rotary member with each other.

In the meantime, regarding the lubricant that is used in the coupling device of this disclosure, grease of NLGI (National Lubricating Grease Institute) consistency No. 2 (worked consistency is 265 to 295) or No. 3 (worked consistency is 220 to 250) or grease of the larger consistency number, which is usually used to lubricate a bearing and the like, has excellent seal stability.

According to the coupling device of this disclosure, the cap is pressed and fixed to the rotary member by the force of the elastic member. Therefore, the cap is to be simply mounted without applying excessive force such as press fitting force to the first rotary member. Thus, even when the first rotary member is an output shaft of the motor, the performance or reliability of a device having the first rotary member is not deteriorated.

Also, the cap forms the accommodation chamber of the connection part, of which an exit is blocked or narrowed by the contact part of the cap to the first rotary member or by the elastic member interposed between the opening-side end face of the cap and the annular end face of the first rotary member, and the lubricant is reserved in the accommodation chamber of the connection part. Thereby, the scattering of the lubricant reserved in the accommodation chamber of the connection part due to the centrifugal force is suppressed and the lubricating effect of the lubricant is exhibited for a long time, so that the long-term durability of the sliding part, i.e., the coupling device is improved.

In the meantime, when the lubricant is grease having high viscosity that is used for lubrication of a bearing, the outward scattering or outflow of the lubricant does not occur even though there is a slight gap between the cap and the first rotary member or between the cap and the second rotary member. Therefore, even when the exit of the accommodation chamber of the connection part is not closed by the seal, the outflow is not caused.

The operations and effects of the illustrative aspects will be described later.

BRIEF DESCRIPTION OF THE DRAWINGS

The foregoing and additional features and characteristics of this disclosure will become more apparent from the following detailed descriptions considered with the reference to the accompanying drawings, wherein:

FIG. 9A is a sectional view illustrating still another example of the coupling device for connecting rotary members of this disclosure;

FIG. 9B is an enlargement of a portion of the sectional view of FIG. 9A;

FIG. 10 is an exploded perspective view illustrating still another example of the coupling device for connecting rotary members of this disclosure;

DETAILED DESCRIPTION

Hereinafter, illustrative embodiments of a coupling device for connecting rotary members of this disclosure will be described with reference to FIGS. 3 to 18.

Figure 1:
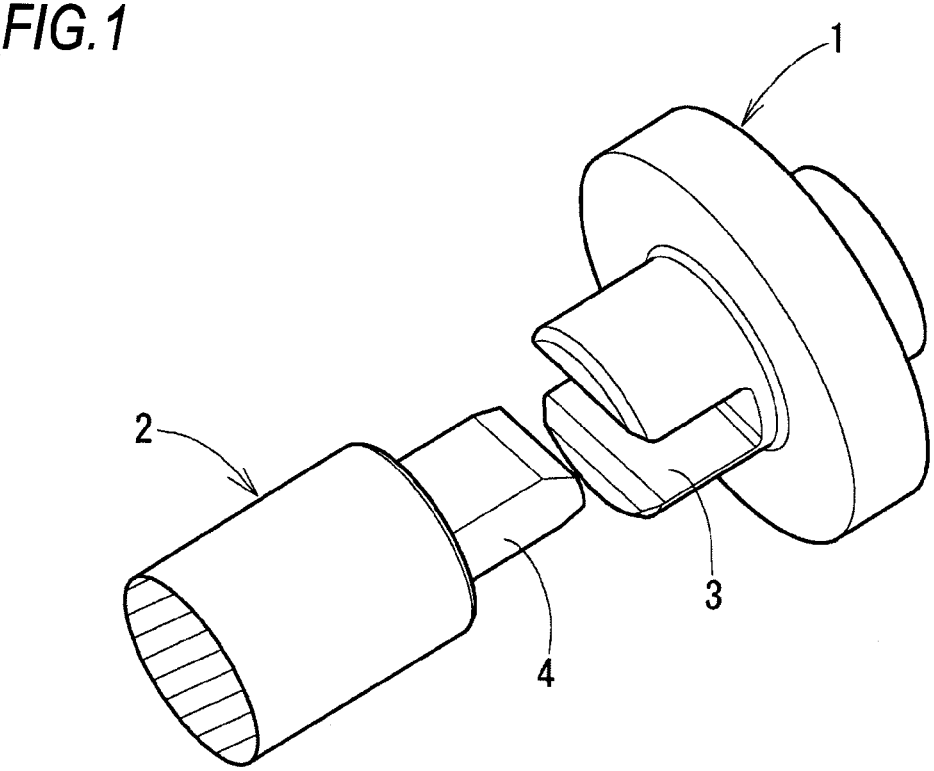
FIG. 1 is an exploded perspective view illustrating an illustrative embodiment of a coupling device to which this disclosure is applied.
Figure 2:
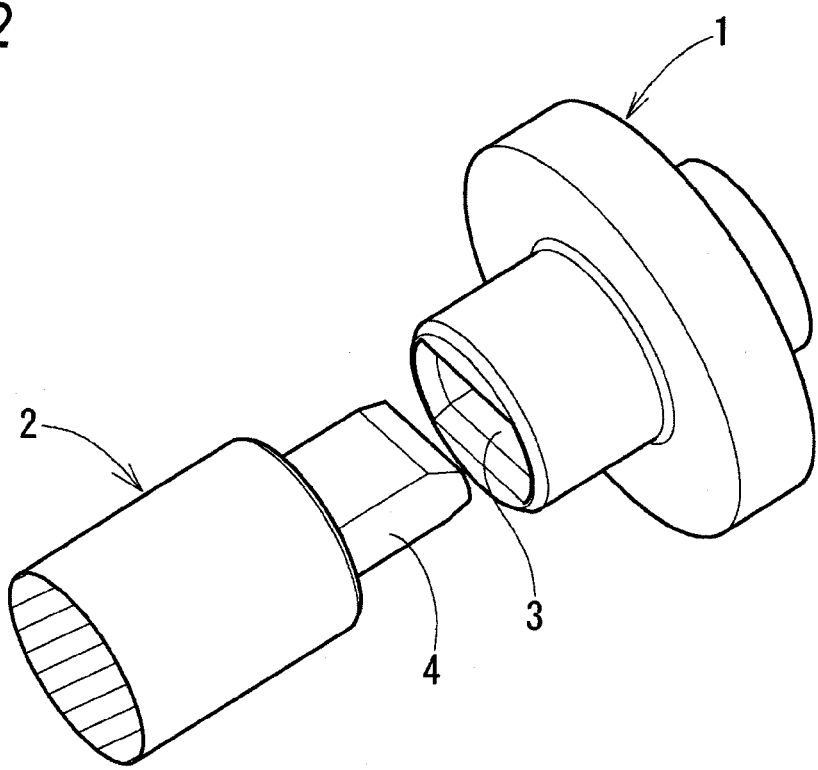
FIG. 2 is an exploded perspective view illustrating another illustrative embodiment of a coupling device to which this disclosure is applied.

First, a basic shape of the coupling device to which this disclosure is applied is shown in FIGS. 1 and 2. FIG. 1 illustrates a coupling device, in which a sliding face of a connection part is opened toward an outer periphery, and FIG. 2 shows a coupling device in which a sliding face of a connection part is not opened toward an outer periphery. In particular, this disclosure is specifically effective when it is applied to the open type coupling device as shown in FIG. 1. However, this disclosure is also effective even though it is applied to the non-open type coupling device as shown in FIG. 2.

According to the coupling devices, a first rotary member 1 and a second rotary member 2 are opposed to each other on the same axial line and are connected so that a diametrically relative displacement is allowed so as to absorb axis deviation.

One of the first rotary member 1 and the second rotary member 2 is a driving shaft that is integrated with an output shaft of a rotation driving source (for example, output shaft of a motor) or attached thereto, and the other is a driven shaft. One end of the first rotary member 1 has a fitting recess 3 that is opened toward a connection-side end face of the first rotary member 1 and the second rotary member 2 has a fitting protrusion 4 (a clevis projection having a mountain shape in the shown examples) that is fitted into the fitting recess 3.

Figure 11:
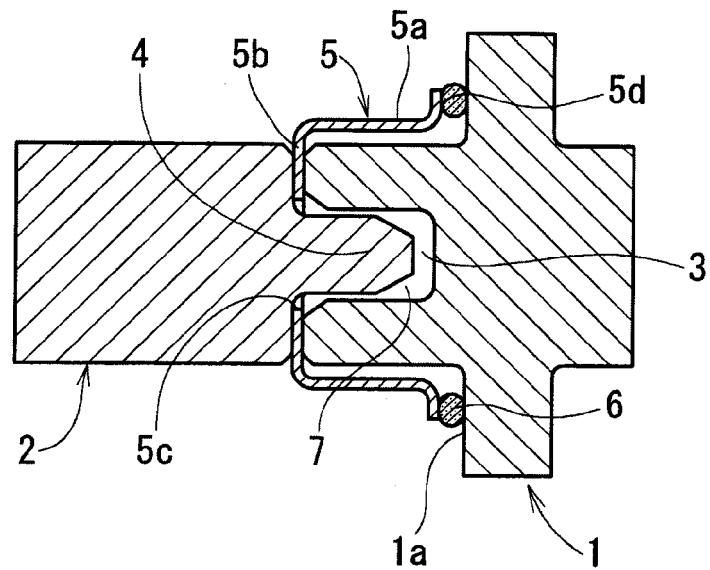
FIG. 11 is a sectional view taken along an axial line of the coupling device of FIG. 10.
Figure 12:
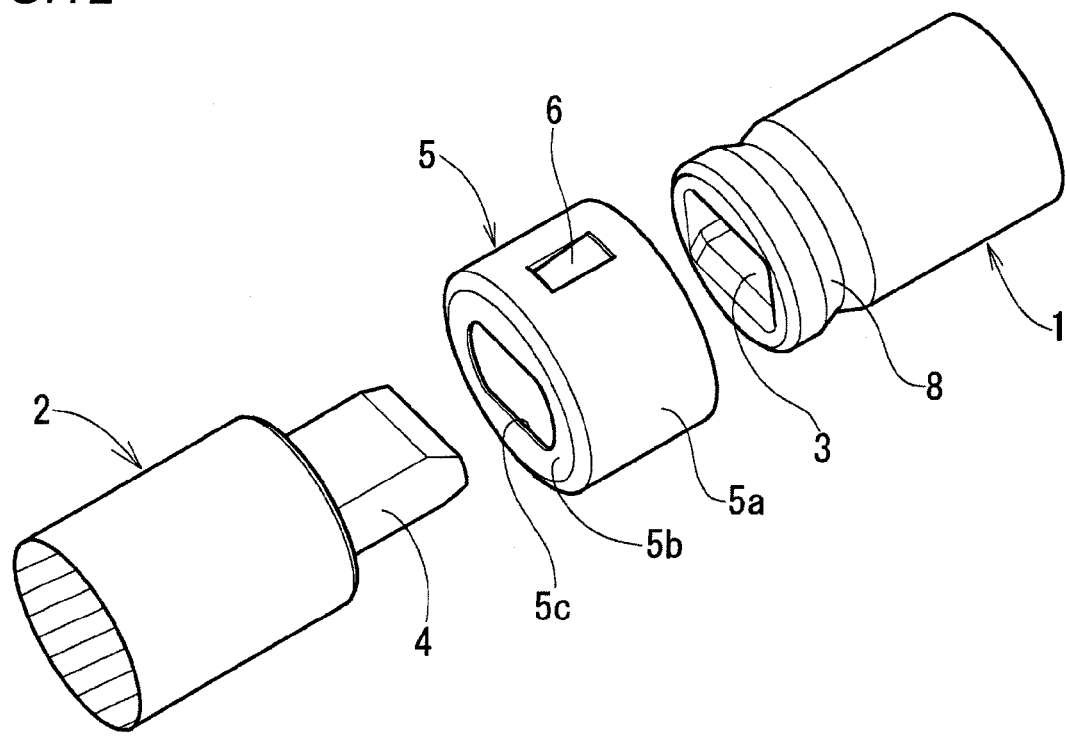
FIG. 12 is an exploded perspective view illustrating still another example of the coupling device for connecting rotary members of this disclosure.
Figure 13:
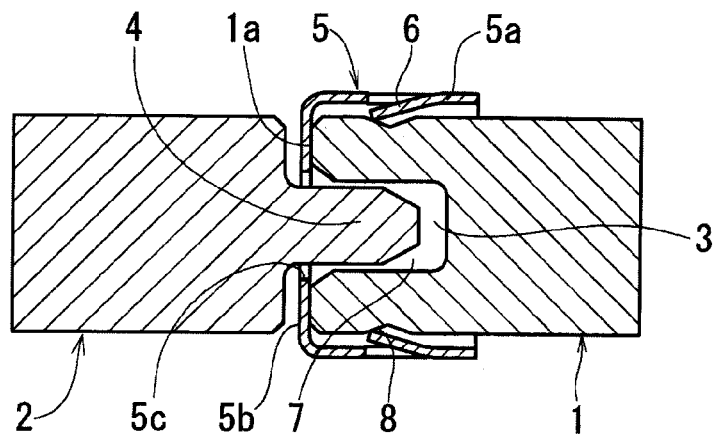
FIG. 13 is a sectional view taken along an axial line of the coupling device of FIG. 12.

The fitting recess 3 is configured by a clevis recess (refer to FIGS. 1, 3 to 11, 17 and 18) or by a rectangle hole (refer to FIGS. 2, 12 and 13). The fitting protrusion 4 is slidably fitted into the fitting recess 3, thereby connecting the first rotary member 1 and the second rotary member 2 so that torque is to be transferred.

The fitting recess 3 and the fitting protrusion 4 are fitted so that a diametrically relative movement is allowed so as to absorb axis deviation. The mutual contact parts of both fitting faces are sliding parts for which the lubrication is made.

A coupling device of this disclosure is configured by additionally providing the coupling device having the above basic shape with a cap 5 covering a connection part of the first rotary member 1 and the second rotary body 2 and an elastic member 6 urging the cap in the axial direction (refer to FIGS. 3 to 18).

The cap 5 is a cylindrical member having a bottom and has a peripheral wall 5a and a bottom wall 5b, and the bottom wall 5b has a protrusion insertion hole 5c through which the fitting protrusion 4 of the second rotary member passes. The protrusion insertion hole 5c has a similar shape to a sectional shape of the fitting protrusion 4 and has a size that does not suppress the diametrically relative movement for absorbing the axis deviation of the fitting protrusion 4 and the fitting recess 3.

The cap 5 covers the first rotary member 1 from an end portion of the first rotary member 1, so that an accommodation chamber 7 of the connection part to reserve lubricant is formed therein.

The elastic member 6 is provided to press and fix the cap 5 to the first rotary member 1 or second rotary member 2 and to block or narrow an exit of the accommodation chamber 7 of the connection part by the pressing.

Figure 3A:
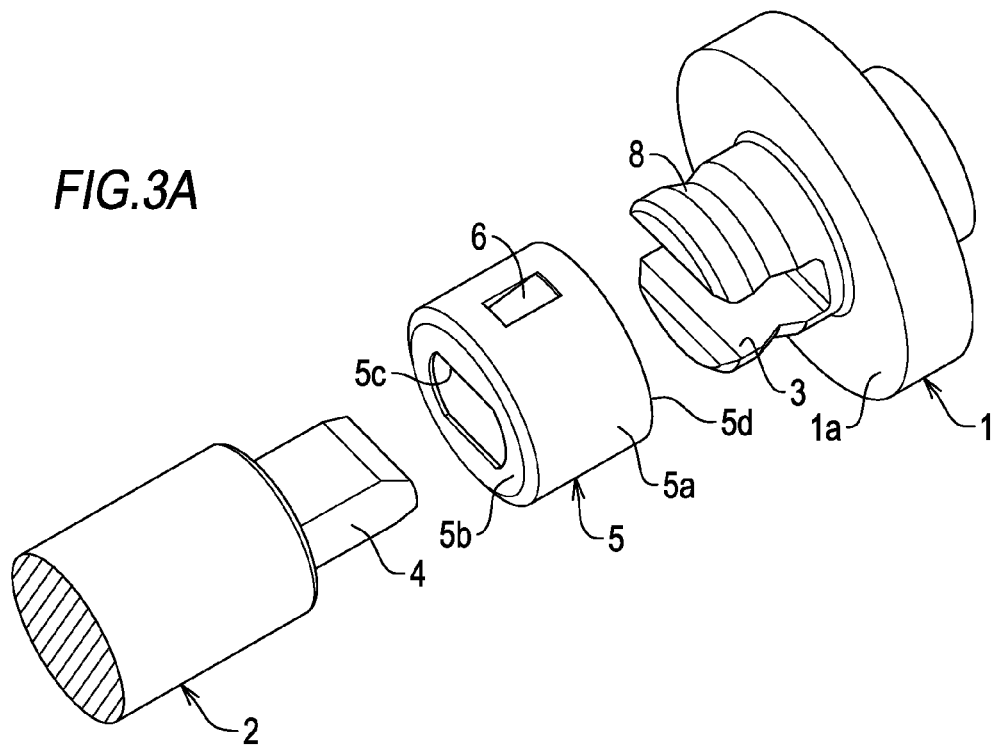
FIG. 3A is an exploded perspective view illustrating an illustrative embodiment of a coupling device for connecting rotary members of this disclosure.
Figure 3B:
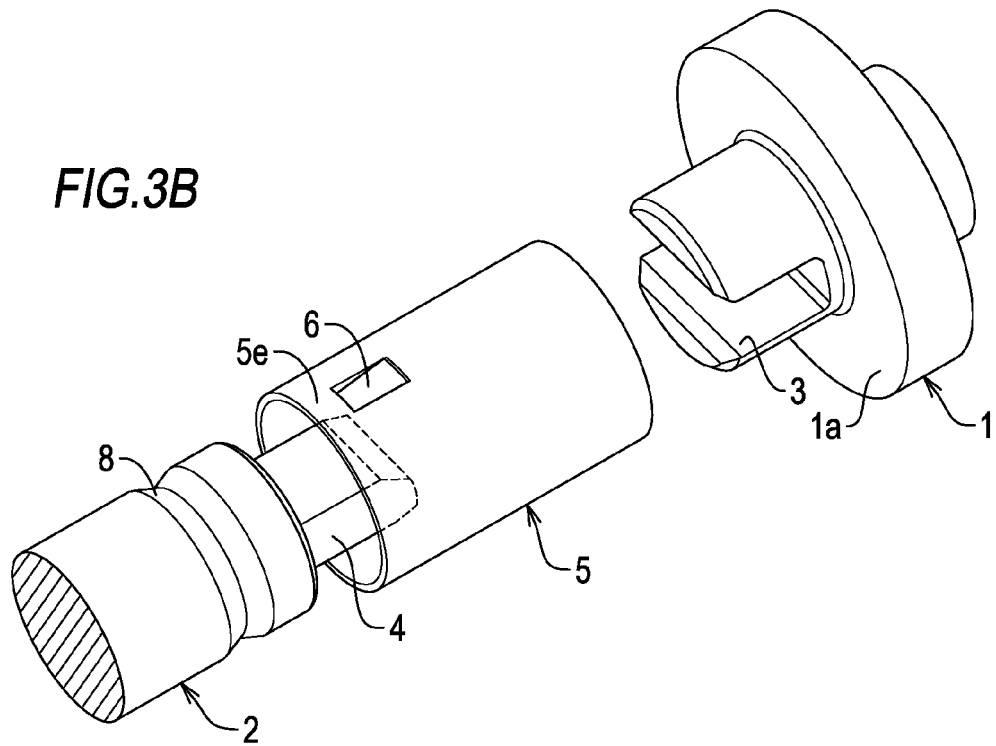
FIG. 3B is an exploded perspective view illustrating an alternative to the illustrative embodiment of FIG. 3A.
Figure 4B:
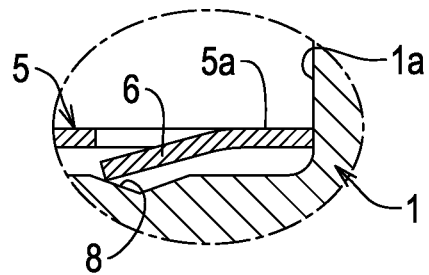
FIG. 4B is an enlargement of a portion of the sectional view of FIG. 4A.
Figure 4A:
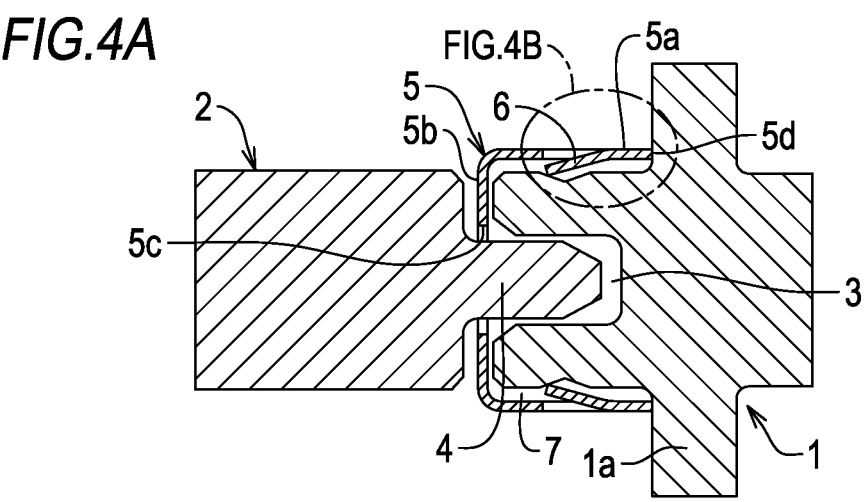
FIG. 4A is a sectional view taken along an axial line of the coupling device of FIG. 3A.
Figure 4C:
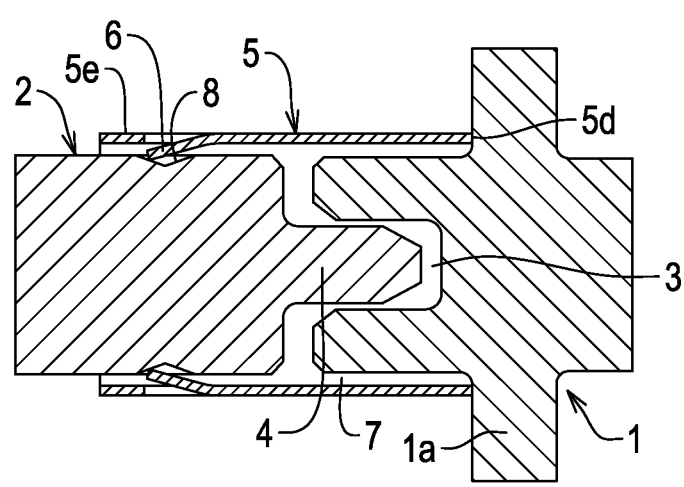
FIG. 4C is a sectional view taken along an axial line of the coupling device of FIG. 3B.

In the coupling device of FIGS. 3 and 4, the elastic member 6 is integrally formed with the cap 5. A part of the peripheral wall 5a of the cap is inwardly cut and bent to form a lancing piece as the elastic member 6. A free end of the elastic member 6 is elastically pressed onto an inclined face 8 for bearing a reaction force, which is formed on the outer periphery of the first rotary member 1. The elastic member 6 also serves as a check claw. Thereby, the cap 5 is suppressed from being unintentionally separated and the force for pressing the cap is also maintained.

The inclined face 8 is configured by a face that is diametrically displaced toward an inner side as an axial distance from the second rotary member 2 is increased. By the pressing to the inclined face 8, an axial component force is caused in a right direction of FIG. 4 at a contact point of the elastic member 6 to the inclined face 8. By the force, an opening-side end face 5d of the cap 5 is pressed to an annular end face 1a formed on the outer periphery of the first rotary body 1, so that the cap 5 is fixed to the first rotary member 1. Also, by the pressing of the cap to the annular end face 1a, a gap (the exit of the accommodation chamber 7 of the connection part, in this illustrative embodiment) of the pressing part is narrowed, so that the lubricant (not shown) injected into the accommodation chamber 7 of the connection part is suppressed from flowing out to the outside through the exit of the accommodation chamber of the connection part.

In the meantime, when an inner edge of the protrusion insertion hole 5c is structured to be positioned at a more inward side than an opening edge of the fitting recess 3, the lubricant in the accommodation chamber 7 of the connection part is moved toward a more outward side than the opening edge of the protrusion insertion hole 5c along an inner face of the fitting recess 3 by the centrifugal force. Thus, the outflow of the lubricant through the protrusion insertion hole 5c is more perfectly suppressed. However, when the lubricant is grease, the outflow of the lubricant through the protrusion insertion hole 5c is suppressed even though the above measure is not provided.

The coupling device shown in FIGS. 3 and 4 is to be mounted without press fitting the cap 5 to the first rotary member 1. Also, even when the first rotary member 1 is an output shaft of a motor, for example, the cap 5 may be mounted to the output shaft in advance and then the connection with the second rotary member 2 may be configured.

In the meantime, the cap 5 is preferable because the structure shown in FIG. 3A is to be mounted to the first rotary member 1 in advance. However, as shown in FIG. 3B, the cap 5 may be provided with a cylindrical extension part 5e surrounding an outer periphery of the connection-side of the second rotary member 2, a part of the cylindrical extension part 5e may be inwardly cut and bent to form the elastic member 6. The outer periphery of the second rotary member 2 has the inclined face 8 that is diametrically displaced toward the inner side as it is directed toward the first rotary member 1, thereby elastically pressing the elastic member 6 onto the inclined face 8. Also with this structure, the cap is pressed to the annular end face 1a.

Figure 5:
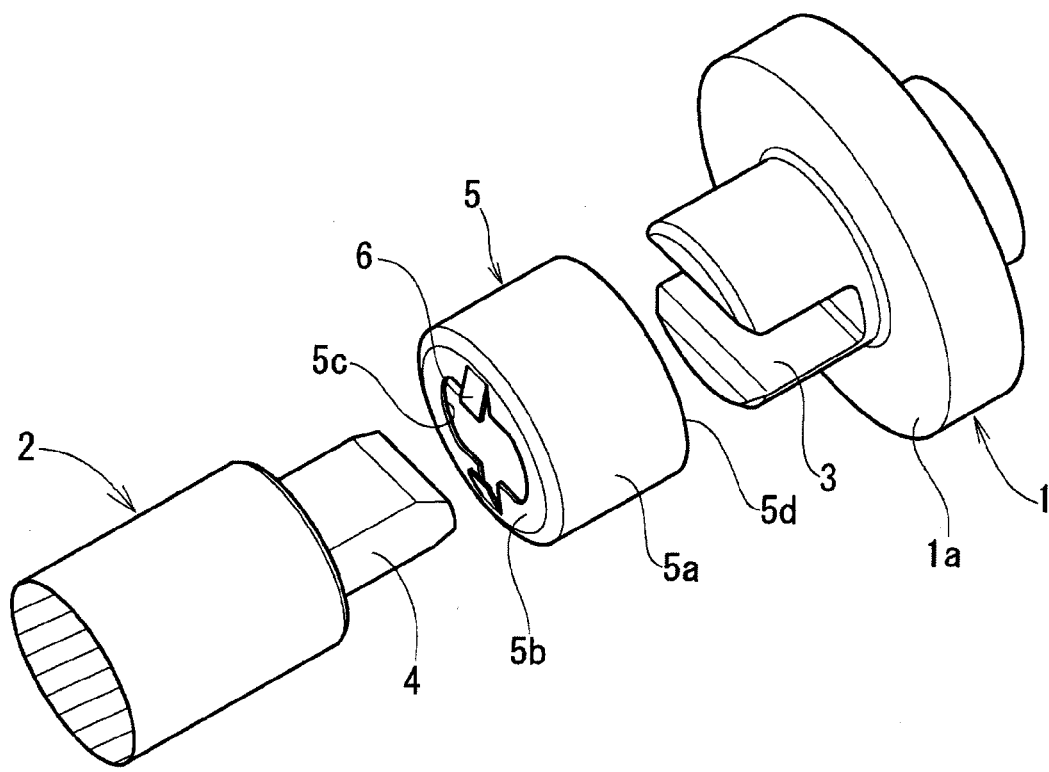
FIG. 5 is an exploded perspective view illustrating another example of the coupling device for connecting rotary members of this disclosure.
Figure 6:
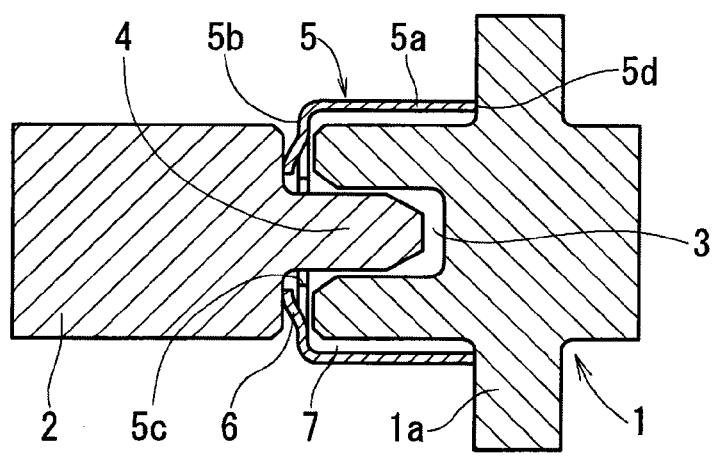
FIG. 6 is a sectional view taken along an axial line of the coupling device of FIG. 5.

Further, in a coupling device shown in FIGS. 5 and 6, the elastic member 6 is integrally formed with the cap 5. In this configuration, a part of the bottom wall 5b is outwardly cut and bent to form a lancing piece as the elastic member 6, and the elastic member 6 is elastically deformed and positioned between the first rotary member 1 and the second rotary member 2. By the force of the elastic member 6, the opening-side end face 5d of the cap 5 is pressed to the annular end face 1a. Also with this structure, the objects of fixing the cap 5 and narrowing the exit of the accommodation chamber 7 of the connection part are realized.

Figure 7:
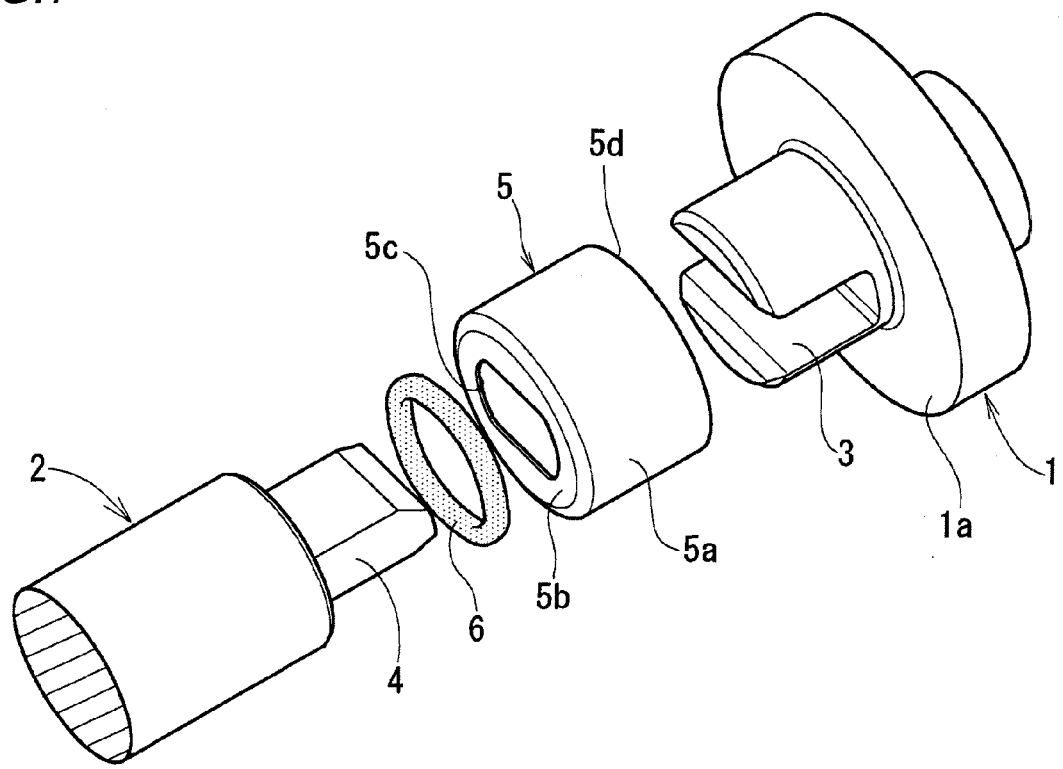
FIG. 7 is an exploded perspective view illustrating still another example of the coupling device for connecting rotary members of this disclosure.
Figure 8:
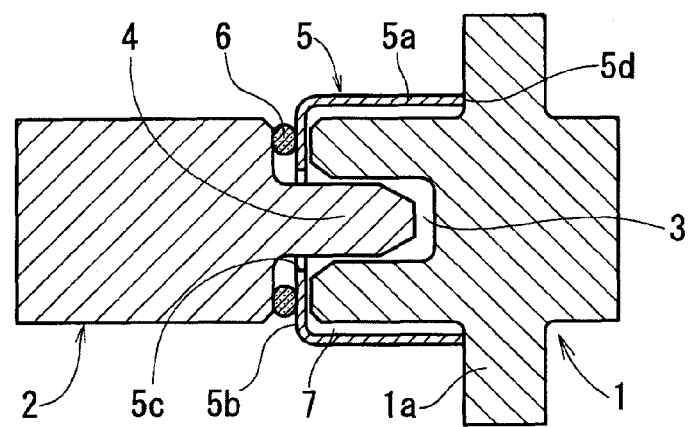
FIG. 8 is a sectional view taken along an axial line of the coupling device of FIG. 7.

Further, a coupling device shown in FIGS. 7 and 8, an elastic member 6 that is provided independently from the cap 5 is used, and the elastic member 6 is elastically deformed and positioned between the first rotary member 1 and the second rotary member 2. By the force of the elastic member 6, the opening-side end face 5d of the cap 5 is pressed to the annular end face 1a. According to this configuration, an annular elastic member having sealability such as O-ring is used as the elastic member 6. Thus, it is possible to cope with the leakage from the protrusion insertion hole 5c of the cap 5. If the sealability is not required, a wave washer and the like may be used as the elastic member 6.

Further, in a coupling device shown in FIG. 9, the outer periphery of the first rotary member 1 has an annular groove 9 having an inclined face 8, an inner face of the peripheral wall of the cap 5 has an annular groove 5f corresponding to the annular groove 9 and an elastic member 6 such as O-ring is interposed between both grooves 9, 5f at positions of the annular groves 9, 5f with being deviated in the axial direction. Also with this structure, the cap 5 is to be axially urged and pressed to the first rotary member 1 by the force of the elastic member 6.

The axial pressing of the cap 5 to the first rotary member 1 is made so that the opening-side end face 5d of the cap 5 is pressed to the annular end face 1a of the outer periphery of the first rotary member 1. However, as described below, the pressing may be made so that the bottom wall 5b of the cap 5 is pressed to a connection-side end face (which is also considered as an annular end face) of the first rotary member 1. It is to be applied that the configurations of FIGS. 3 to 8 are also the same.

Also in a coupling device shown in FIGS. 10 and 11 (these are corresponding with the second illustrative embodiment, and the others are corresponding with the first illustrative embodiment), the elastic member 6 that is provided independently from the cap 5 is adopted. In this configuration, the elastic member 6 is axially pressed and positioned between an opening-side end face 5d of the cap 5 provided with a flange, and the annular end face 1a of the outer periphery of the first rotary member 1. Hence, the cap is pressed to the connection-side end face of the second rotary member 2 by the force of the elastic member.

Also with this configuration, the cap is to be fixed using the force of the elastic member. Meanwhile, in this configuration, a gap may occur between the bottom wall 5b of the cap and the connection-side end face of the first rotary member 1. When the gap is large, the lubricant may flow to the position of the opening-side end face of the cap 5. Therefore, it is preferable to use an annular element, for example, an O-ring having a seal function, if possible, as the elastic member 6.

FIGS. 12 and 13 show that this disclosure is applied to the coupling device of FIG. 2, in which a sliding face of a connection part is not opened toward an outer periphery. The bottom wall 5b of the cap 5 is pressed to the connection-side end face (annular end face 1a) of the first rotary member 1 by the force of the elastic member 6. Regarding this point and the fitting recess 3 having a rectangle hole shape, this coupling device is different from that shown in FIG. 3. The other configurations are the same as those of FIG. 3.

Like this, with the structure in which the bottom wall 5b of the cap 5 is pressed to the connection-side end face of the first rotary member 1 to block or narrow the exit of the accommodation chamber 7 of the connection part in which the lubricant is reserved, the objects of this disclosure are realized. In this configuration, since the bottom wall 5b of the cap 5 is pressed to the connection-side end face of the first rotary member 1, it is possible to realize a desired coupling device even though the first rotary member 1 is not provided with the annular end face pressing the opening-side end face of the cap 5.

Figure 14:
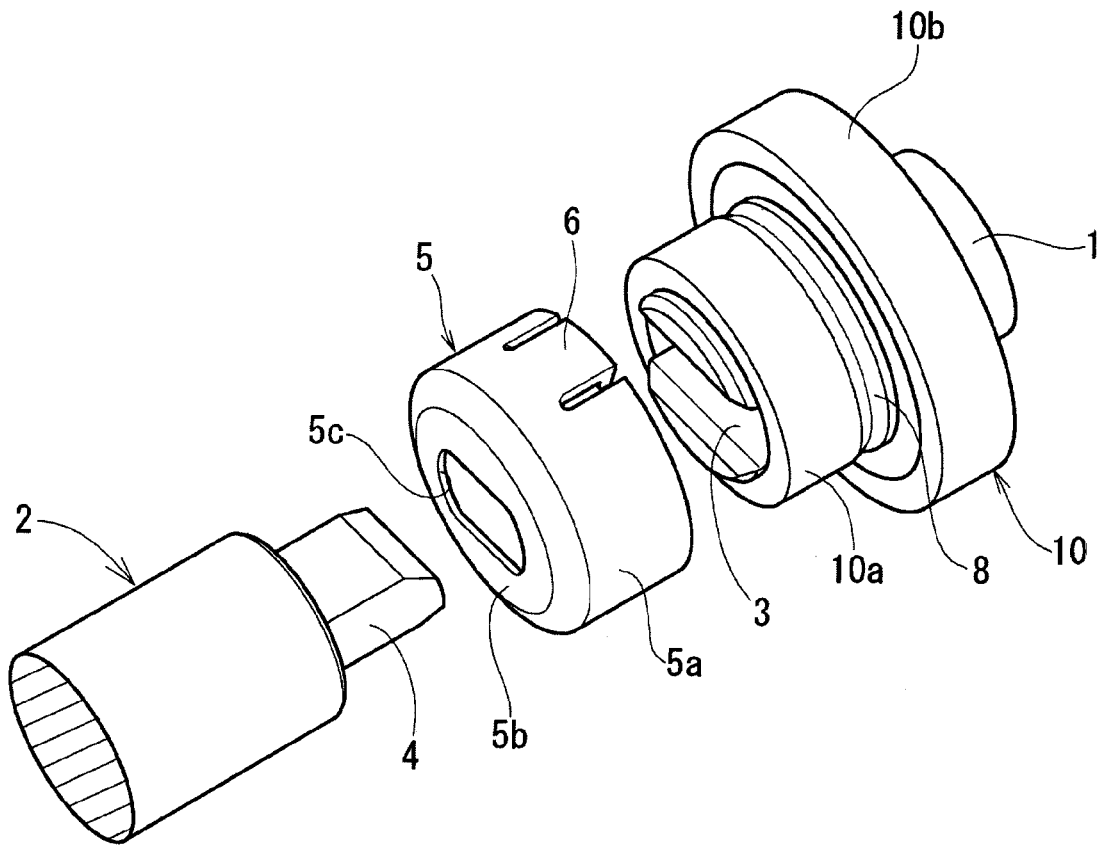
FIG. 14 is an exploded perspective view illustrating still another example of the coupling device for connecting rotary members of this disclosure.
Figure 15B:
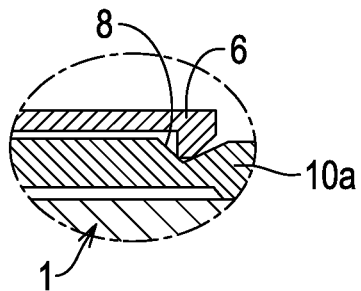
FIG. 15B is an enlargement of a portion of the sectional view of FIG. 15A.
Figure 15A:
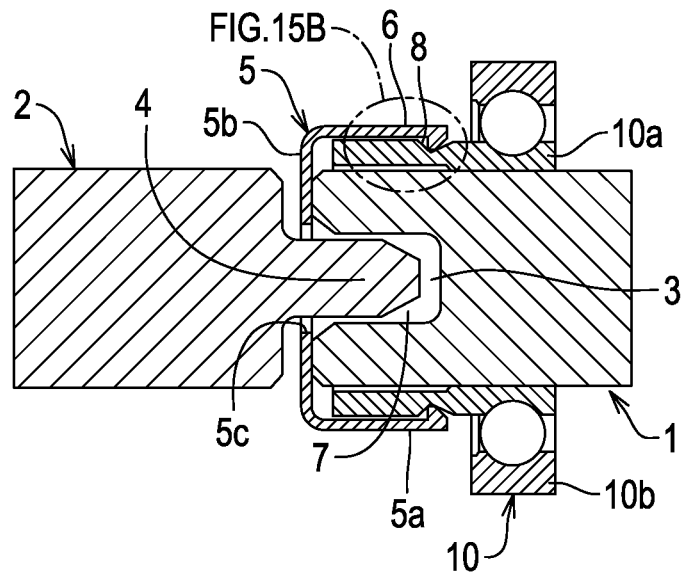
FIG. 15A is a sectional view taken along an axial line of the coupling device of FIG. 14.
Figure 16:
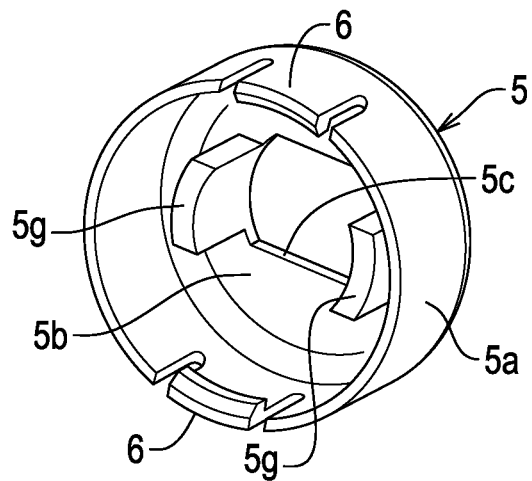
FIG. 16 is a perspective view of a cap that is used in the coupling device of FIG. 14, as viewed from an opening side.

FIGS. 14 to 16 show a coupling device in which a bearing 10 is provided on the outer periphery of the first rotary member 1 and an inner race 10a of the bearing 10 is considered as a part of the first rotary member 1 and is used to fix the cap 5.

The inner race 10a of the bearing 10 is designed to have a special shape longer than an outer race 10b in the axial direction and is fixed to the outer periphery of the first rotary member 1. An outer periphery of the inner race 10a has an inclined face 8 for bearing a reaction force, which is inclined in a predetermined direction. A free end of an elastic member 6 that is integrally formed with the cap 5 is engaged onto the inclined face 8, so that the cap 5 is fixed to the first rotary member 1.

The elastic member 6 that is used in this configuration is formed to be elastically deformed in the diametrical direction by cutting a part of the cap 5 from the other part. A claw of the free end of the elastic member 6 formed as described above is pressed to the inclined face 8, so that an axial component force is caused at a contact point with the inclined face 8. Also with this configuration, since the bottom wall 5b of the cap 5 is pressed to the connection-side end face of the first rotary member 1, it is possible to realize the coupling device of this disclosure even though the first rotary member 1 is not provided with the annular end face.

Figure 17:
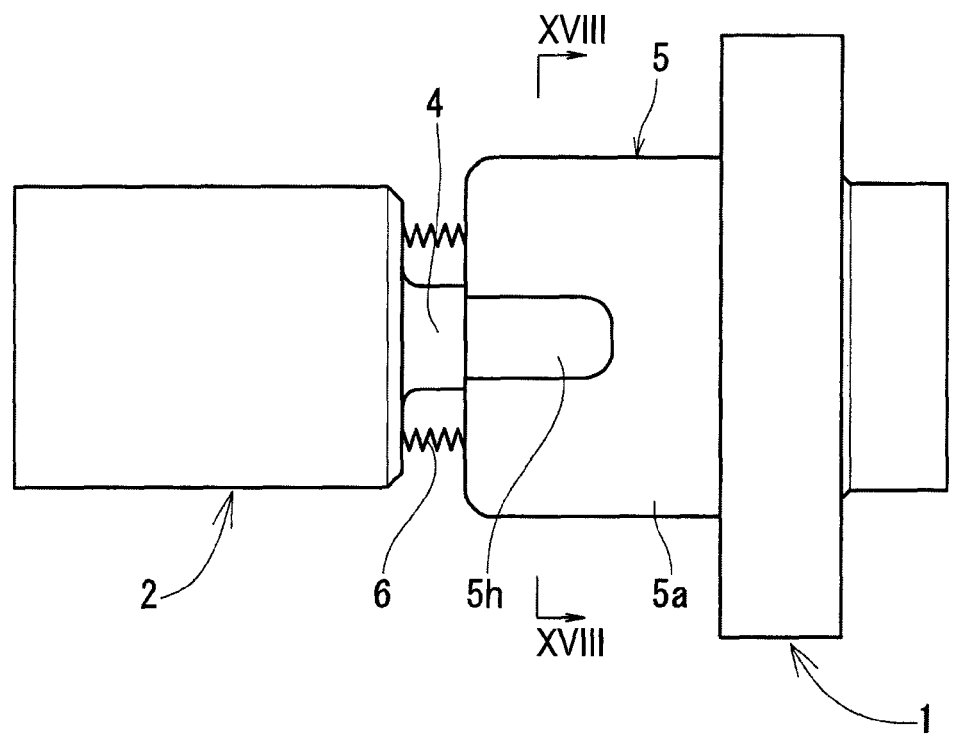
FIG. 17 is a side view illustrating still another example of the coupling device for connecting rotary members of this disclosure.
Figure 18:
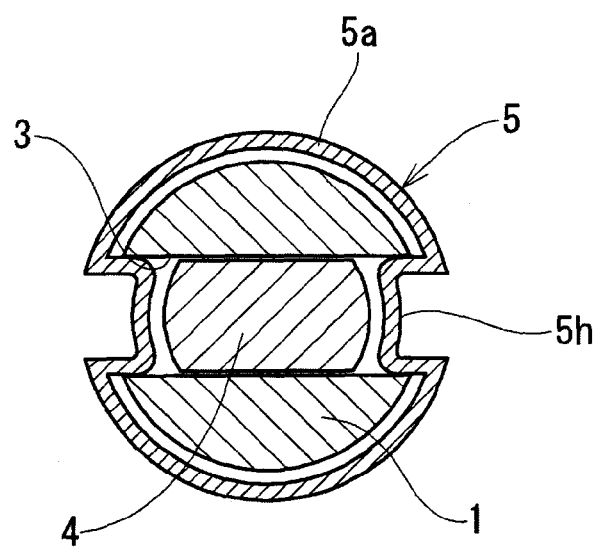
FIG. 18 is a sectional view taken along a line XVIII-XVIII of FIG. 17.

FIGS. 16 to 18 show an example of a structure with which the cap 5 is fixed to the first and second rotary members 1, 2 so that a relative rotation thereof is blocked.

The cap 5 can suppress the relative rotation to the first and second rotary members 1, 2 by forming the protrusion insertion hole 5c of a non-circular hole on the bottom wall and thus fitting the fitting protrusion 4 of the second rotary member 2 therein so that it cannot be relatively rotated. However, the relative rotation of the cap with respect to the first and second rotary members is to be also blocked with a structure where projections 5g protruding from an inner face of the bottom wall 5b in an axially inward direction, as shown in FIG. 16, or projections 5h protruding from an inner face of the peripheral wall 5a in the diametrical direction, as shown in FIGS. 17 and 18, are provided and the projections 5g or 5h are inserted into a part of the fitting recess 3 and are thus engaged with the inner face of the fitting recess 3. The projections 5h shown in FIGS. 17 and 18 also have a function of suppressing the scattering of the lubricant received in the fitting recess due to the centrifugal force.

As virtually shown with the dashed-dotted line in FIG. 16, the projections 5h axially protrude from the inner face of the bottom wall 5b.

As described above, according to the coupling device of this disclosure, the connection part is covered by the cap that is to be simply mounted without applying excessive load to the first rotary member, the cap is pressed to the first or second rotary member by the force of the elastic member to configure the accommodation chamber of the connection part, which has the blocked or narrowed exit in the cap, and then the lubricant is reserved in the accommodation chamber of the connection part. Therefore, even when the first rotary member is an output shaft of a motor, for example, the performance or reliability of a device having the first rotary member is not deteriorated. Also, the scattering of the lubricant, which is reserved in the accommodation chamber of the connection part, due to the centrifugal force is securely suppressed, so that the lubricating effect of the lubricant is exhibited for a long time.

Accordingly, the coupling device of this disclosure is to be used for connecting the rotary members, for which the long-term reliability is required. For example, a brake fluid pressure control unit for a vehicle is an apparatus that is used in a strict environment where the influence of heat or vibration is great, such as engine compartment of a vehicle, and has a function of braking the vehicle and for which the extremely high reliability is required. The brake fluid pressure control unit needs to be further miniaturized due to the limited mounting space in the vehicle. Thus, a mounting space of a lubricating apparatus itself is also limited.

Also, according to the coupling device of this disclosure, the cap is to be mounted a completely assembled motor afterward. Thus, it is possible to avoid influencing the manufacturing process of the motor.

This disclosure is to be appropriately used as a coupling device that connects a rotary shaft of a gear pump provided in the brake fluid pressure control unit and an output shaft of a motor rotating the rotary shaft.

What is claimed is:

1. A coupling device, which includes a first rotary member and a second rotary member opposed and connected to each other on the same axial line, and in which a fitting recess provided to the first rotary member and a fitting protrusion provided to the second rotary member corresponding to the fitting recess are fitted each other to connect both of the rotary members so that torque is to be transferred, wherein a cap to cover a connection part is a cylindrical shape having a bottom wall and a protrusion insertion hole, through which the fitting protrusion of the second rotary member passes, formed on the bottom wall and covers the first rotary member from a connection end-side of the first rotary member, wherein the cap is axially urged by an elastic member to bring at least one of an opening-side end face and the bottom wall of the cap into contact with an annular end face formed on the first rotary member, wherein an accommodation chamber of the connection part is formed in the cap to reserve lubricant, and an exit of the accommodation chamber of the connection part is blocked or narrowed by a force of the elastic member, wherein the elastic member is configured by a lancing piece integrally formed with the cap, wherein a slanted face bearing a reaction force is formed on an outer periphery of at least one of the first rotary member and second rotary member, and the elastic member is elastically pressed to the slanted face, so that the cap is pressed to the annular end face and is fixed to at least one of the rotary members by an axial component force generated at the elastic pressing part, wherein the fitting recess is a clevis recess opened toward the outer periphery of the first rotary member, the lancing piece being provided at a portion different from an opening of the clevis recess, and the fitting protrusion is configured by a clevis protrusion, and wherein the clevis recess and the clevis protrusion are fitted to connect the first rotary member and the second rotary member with each other.

2. The coupling device according to claim 1, wherein a part of a peripheral wall of the cap is inwardly cut and bent to configure the lancing piece, and the lancing piece also serves as a check claw, and wherein the slanted face is configured by a face that is diametrically displaced toward a radially inner side as an axial distance from the bottom wall is increased, and the slanted face is provided on the outer periphery of the first rotary member so that the elastic member is elastically pressed to the slanted face to cause the axial component force.

3. The coupling device according to claim 1, wherein the cap has a cylindrical extension part that surrounds an outer periphery of a connection-side of the second rotary member, and a part of the cylindrical extension part is cut and bent toward a radially inner side of the cap to configure the lancing piece, wherein the slanted face is configured by a face that is diametrically displaced toward a radially inner side as an axial distance from the fitting recess of the first rotary member is decreased, and wherein the slanted face is provided on the outer periphery of the second rotary member so that the elastic member is elastically pressed to the slanted face to cause the axial component force.

4. The coupling device according to claim 1, wherein the fitting protrusion and the protrusion insertion hole of the cap, through which the fitting protrusion is inserted, are made as a protrusion having a non-circular section and a hole having a non-circular section corresponding thereto, respectively, and wherein the fitting protrusion and the protrusion insertion hole are fitted to each other to suppress relative rotation of the cap with respect to the rotary members.

5. The coupling device according to claim 1, wherein the cap has at least one of a projection diametrically protruding from an inner face of a peripheral wall toward a radially inner side and a projection protruding from an inner face of the bottom wall in an axial direction, and wherein the at least one of the projections is inserted into a part of the fitting recess and is engaged with an inner face of the fitting recess to suppress relative rotation of the cap with respect to the rotary members.

* * * * *